Aug. 31, 1926.
J. H. HORSBURGH
QUICK ACTING VALVE MECHANISM
Filed Nov. 13, 1922
1,597,794
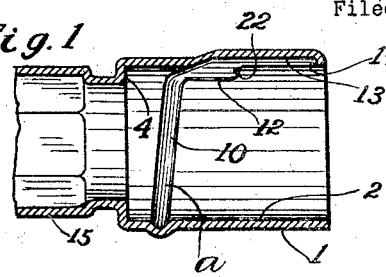
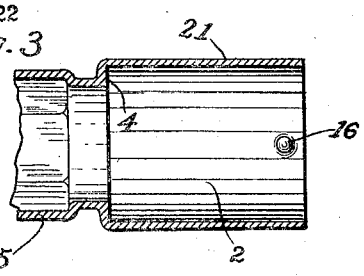
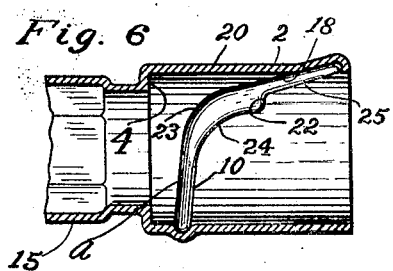
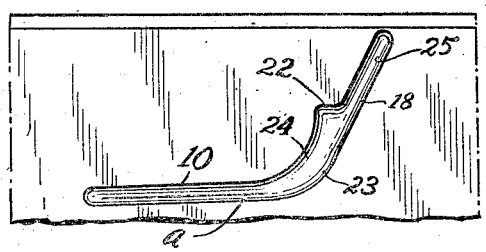
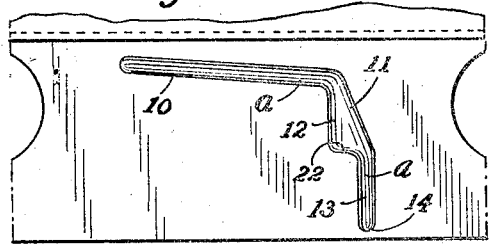
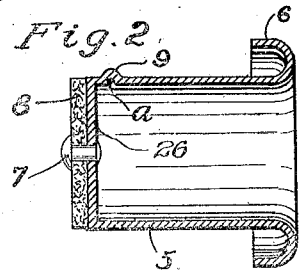
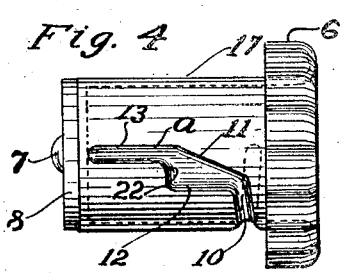
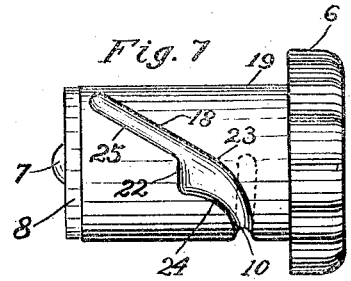
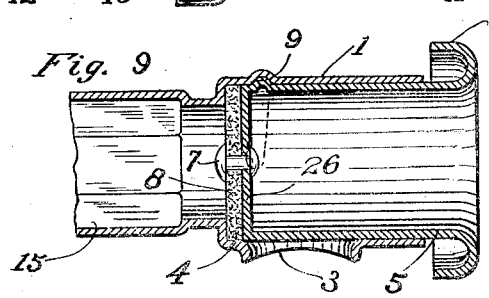
INVENTOR
John H. Horsburgh
BY Gray and Lilly
ATTORNEYS Patented Aug. 31, 1926.

1,597,794

UNITED STATES PATENT OFFICE.

JOHN H. HORSBURGH, OF CLEVELAND, OHIO.

QUICK-ACTING VALVE MECHANISM.

Application filed November 13, 1922. Serial No. 600,786.

This invention relates to quick-acting valves as an improved form of pouring mechanism for controlling the flow of liquids through an opening, and particularly to valves for controlling the flow of heavy liquids such as oils out through an outlet in a container such as barrels or tanks. It is especially useful in faucets that are to be inserted in containers having standard outlets—usually 1 inch bore; though I am aware that my quick-acting valve is of advantage in other mechanisms than faucets and that, if so used, they may be used in other faucets than those for drawing off oils, and for draining other liquid holders than barrels or tanks.

My invention is especially useful in valves that are to be actuated manually, and that it is very desirable to open or close suddenly, and yet that will be securely held in either the open or the closed position. The containers requiring my type of valve are made for purpose of shipment mostly, and are shipped to their destination with an ordinary plug, the character of which together with the relatively small size of outlet tends to make the latter almost leak-proof. When the container arrives at its destination, the original plug is removed and a valved element is substituted of a type that will make possible the maximum speed of flow, and the latter condition accordingly requires the shortest possible period for opening and closing the valve that will be consistent with certainty of action. My valve is presented as one meeting these conditions.

The particular types of valves shown hereinafter, in which my invention is disclosed embody a substantially cylindrical shell or body from which a spout leads outward therefrom at right angles to the shell, and the latter, as formerly constructed, is provided with internal threads to receive an externally threaded plug therein for entering the shell opening and eventually engaging the valve seat. The latter threaded construction is the conventional type, and has been found to necessitate too slow action, for the valve plug must be advanced quite a long distance from the open position before engaging the seat, and many revolutions of the plug must be made before reaching the seat. My improved structure here disclosed and claimed, has for its object to avoid the serious delay in actuation hitherto believed to be insurmountable.

Several embodiments of my invention are shown in the accompanying drawings, in which—

Figure 1 is a central longitudinal section of a hollow shell disclosing the valve seat, and particularly showing the cam groove on the interior of the shell;

Figure 2 is a similar section of a valve plug for fitting the shell in Fig. 1, there being shown a pin on the surface of the plug for travel in the cam groove of the shell;

Figures 3 and 4 are views of a modified form of valve members, the former being a longitudinal section of the shell, and the latter a side elevation of the plug, for a valve in which the pin is shown on the inner wall of the shell and the cam groove on the exterior of the plug;

Figure 5 shows a development in a plane of the cam groove as used in either of the above described forms;

Figures 6 and 7 are views of a third form of valve elements, both showing a different form of cam groove, the former being a shell in section and the latter showing a plug in side elevation whose groove is designed to receive the pin in the shell of Fig. 3;

Figure 8 shows a development in a plane of the cam groove shown in Figs. 6 and 7, and Figure 9 is a central longitudinal section of an assembled valve mechanism of the first or preferred form of my device.

In all forms, 1 represents the valve shell having the valve chamber 2, and a discharge spout 3, there being the inturned valve seat 4 at one end of said chamber. The valve plug 5 shown in Fig. 2 has an outwardly turned rim which is fluted and thereby provides convenient means for manual rotation. The closed end 26 of the plug has means 7 for attachment of a suitable washer 8, and the external surface of the cylindrical wall has a pin 9 for engagement in the cam groove $a$ on the inner surface of the shell. I have formed this groove as shown in detail in Fig. 5, where 10 designates the low-pitch section embodying a spiral whereby the latter part of the rotation of the plug within the shell will exert a very strong pressure against the valve seat 4. 11 and 12 designate respectively an inclined edge and a longitudinal edge of the intermediate section of the groove. From the latter section a lengthwise section 13 of the groove is reached into which the intermediate section merges, and the plug is held from wholly escaping from the shell by the end 14 of the slot opposing further movement of the pin 9. The term "pin" is used throughout this specification and the claims in the generic sense, in some cases and in some forms being intended to cover a mere protuberance pressed out from the metal at the end of the line.

Figs. 1, 2, 5 and 9 therefore show my preferred form of valve mechanism, the plug shown in Fig. 2 being shown in Fig. 9 assembled with the shell of Fig. 1. Back of the valve seat 4 is the structure from which the fluids may be discharged by my valve. I have not shown such structure in detail, as I do not care to limit myself to the details of the rear connections which do not bear directly upon the valve features per se. There may or may not be a nut section 15 back of the seat, and back of the nut may be conventional means for connection with a source of fluid.

In Figs. 3 and 4 is shown another form of quick-action valve shell and plug. In this form, the pin 16 is provided on the inner surface of the shell, while the groove, similar in all respects to that shown in Figs. 1 and 5, is carried on the outer surface of the plug 17. The operation of this form is much the same as that of the preferred form.

In Figs. 6, 7 and 8 is shown another or third form of my device, the shell in Fig. 6 differing from that shown in Fig. 1 in that its cam groove is helical at its outer portion, having no longitudinal section such as 13 of Figs. 1 and 5. Though the transverse section 10 of the preceding forms is used, the intermediate section is formed of a groove having curved edges 23 and 24 which are not quite parallel, the outer edge 23 merging with the edge 18 of the helical groove 25, and the edge 24 of shorter radius terminating at one end of the stop or shoulder 22, the other end of which merges with said helical groove 25.

The same form of cam groove just described may obviously be used on the exterior of the plug, as shown in Fig. 7 in cooperation with the shell of Fig. 3. It is further to be noted that these valve plugs, shown in Figs. 2, 4, 7, and 9 as hollow, may, by slight modification, be made solid without departing from the spirit of my invention. It is also to be noted that the plug 5 may be used with either of the shells 1 or 20; while either of plugs 17 or 19 may be used with shell 21.

From this it will be seen that all three forms here shown provide a quick-acting valve mechanism which includes an intermediate section whereby the entire cam groove may be divided at will, thus affording the use of a part only of the groove and a suitable stop for holding the parts in the intermediate position; and at the same time provide adequate pressure of the closed end of the faucet against the valve seat 4.

From the description above given the operation of the device will probably be clear, but certain special advantages are gained by the device which I will explain with more detail: In the forms shown in Figs. 1 to 5 and 9, the intermediate section of the cam groove has a peculiar action which is of more than ordinary importance. Assuming that the valve is closed, and that it is desired to withdraw the plug to open the valve the initial counter-clockwise rotation of the plug, as shown in the drawings, causes a gradual release of the plug as the pin rides back in section 10 of the groove, then an alternative is presented—the pin may hug the inclined edge 11 of the intermediate section or it may follow the contour of the longitudinal edge 12. In either case, the pin may be effectually guided into the section 13 which permits quick withdrawal until the pin reaches the end of the slot at 14. This permits the steady and continuous withdrawal of the plug by exerting a pulling action on the plug and at the same time exerting a slight rotative force in a counter-clock-wise direction to insure the travel of the pin against the edge 11.

If, however, it is desired to not withdraw the plug to the extreme limit, but to lock it in an intermediate position, it is only necessary to rotate the plug until the pin is released from section 10, and then exert a clock-wise force thereto, when the travel of the pin will follow the edge 12 and finally reach the shoulder which we have designated in the drawings by 22, the plug being then locked in such position until some other force is applied to it.

This operation is very pronounced in closing the valve. An end thrust on the plug will tend to close the same until it reaches 10 where a slight rotative force will be required, the amount depending on the pressure exerted by the liquid against the valve. If it is desired to close the valve from the extreme open position to the intermediate section of the cam groove, an end thrust should be given at the same time exerting a clock-wise force so that when the pin reaches the intermediate section of the groove, it will take its position on the shoulder 22 as before explained. It will therefore be seen that the merging of the intermediate section into the lengthwise portion makes possible the consideration, for some purposes, of these two portions or sections as unitary.

The operation of the third form of my device, shown in Figs. 6, 7 and 8, differs from the others in that the withdrawal of the plug necessitates rotation thereof throughout its longitudinal movement, though at different rates as the pin follows the groove formed of curves of different radius. In this case though, as in the other forms, the stop or shoulder 22 may be used to position the pin at the intermediate section, when it is desired to withdraw the plug only a portion of the distance and thus open the valve but part way. In other respects, the operation is very similar to that of the other forms.

While my device is here shown as a hollow shell receiving therein a hollow valve plug, it is to be understood that I am by no means restricted to such construction. Solid plugs can be provided with the cam groove here shown, and in some instances may be preferred to the hollow plugs here illustrated. Nor is it essential that the manually-operated part of the plug shall be designed as a corrugated rim or lip. The operating part may be wings or other shaped protuberances if desired, and still make use of the main features of my invention. Nor need the over-hanging lip, if used, be integral with the body of the plug as here shown. It may be, and in some instances will be made of a separate part to be secured to said body part as needed.

While the term "groove" is used promiscuously throughout the description of this case, and is used in the claims following, it is to be understood that it is intended in its broad sense, and is used so broad as to include the term slot as well, so that the claims are to be read as including a cam cut either wholly or partially through the metal wall where a cam is needed.

I do not claim a bayonet slot in a valve plug, nor do I otherwise restrict myself to valve plug structure, but what I do claim and desire to secure by Letters Patent is,—

1. A pouring mechanism comprising telescoping valve members one of which has on its surface a composite cam groove including a transverse section, a section extending substantially lengthwise of the valve member and an intermediate section having nonparallel edges one of which connects the other sections, and the opposite edge having a stop means therein, and the other valve member having a protuberance fitting the said groove whereby during release of one member from the other a rotative tendency in one direction will permit continuous movement to the limit of the cam groove and in the other direction will lock the member in an intermediate position.

2. In a pouring mechanism, valve elements comprising a tubular structure and a valve plug, the said structure having an open end, a valve seat spaced from said end, a lateral outlet intersecting the tube between said end and the seat, and the said plug fitting within said open end and adapted to engage said valve seat, one of said valve elements having on its surface a composite cam groove comprising a spiral section, a section extending substantially lengthwise of the tube and an intermediate section having non-parallel edges one of which connects the other sections and the opposite edge having an offset therein to provide a stop, and the other valve element having a protuberance fitting the said groove whereby, during release of the valve plug from the tube, a rotative tendency in one direction will permit continuous movement to the limit of the cam groove and in the other direction will lock the member in an intermediate position.

3. In a pouring mechanism, a cylindrical valve member having on its curved surface a composite cam groove comprising a spiral section of low pitch, a section of high pitch and an intermediate section whose edges are non-parallel and one of which connects the other sections and is of different pitch from either of the others and the opposite edge having a transverse stop for receiving a pin thereon.

4. In a pouring mechanism, a tubular casing having an annular valve seat therein, a lateral outlet intersecting the casing wall and an open end beyond the said valve seat, the inner surface of said casing between the open end and the seat having a composite cam groove comprising a plurality of sections, one of which extends in a direction substantially lengthwise of the tube, another section being spiral but of low pitch, and an intermediate section connecting the other sections and having nonparallel edges one of which has a pitch different from the other sections and the opposite edge having an abrupt stop therein.

5. In a pouring mechanism for liquids, a tubular structure having an internal composite cam groove adjacent the outflow end, a valve seat within the tube and beyond said groove, the latter comprising a plurality of sections one of which is substantially transverse of the body of the tube and of low pitch, and another section having a longitudinal edge and an edge lengthwise of said tubular structure, the said longitudinal edge being of different pitch from that of said low pitch section and connected with said lengthwise edge by an offset providing an abrupt stop blocking a portion of the width of the groove.

In testimony whereof I hereunto affix my signature.

JOHN H. HORSBURGH.